United States Patent Office 3,732,195

Patented May 8, 1973

3,732,195

PROCESS FOR THE POLYMERIZATION OF CONJUGATED DIOLEFINS

Morford C. Throckmorton, Akron, Ohio, assignor to The Goodyear Tire & Rubber Company, Akron, Ohio No Drawing. Original application Sept. 11, 1969, Ser. No. 857,230. Divided and this application June 21, 1971, Ser. No. 155,300

Int. Cl. C08d *1/4*

U.S. Cl. 260—94.3 6 Claims

ABSTRACT OF THE DISCLOSURE

There is disclosed a process for the polymerization of butadiene and butadiene in mixture with other conjugated diolefins to form polymers containing at least 90 percent of the butadiene units in the cis-1,4 configuration comprising contacting at least one diolefin under polymerization conditions with a catalyst comprising (A) at least one organometallic compound, (B) at least one organonickel compound, and (C) at least one compound selected from a group consisting of metal fluoroborates, metal fluorophosphates, metal fluoroantimonates and organic derivatives of fluorophosphates and fluoroantimonates wherein the metal is selected from a group consisting of lithium, beryllium, calcium, magnesium, nickel and cobalt.

This application is a divisional application, pursuant to Rule 147 of the Rules of Practice, of U.S. patent application Ser. No. 857,230, filed Sept. 11, 1969 and titled "Novel Catalyst for the Polymerization of Conjugated Diolefins."

This invention is directed to methods of polymerizing butadiene and butadiene in mixture with other conjugated diolefins to form polymers having a high content of cis-1,4 addition. It is also directed to catalyst systems useful for this purpose.

Polymers of butadiene or butadiene in mixture with other conjugated diolefins containing a high portion of the butadiene units in the cis-1,4 configuration possess properties which make them useful as synthetic rubbers and for providing high impact resistance to plastics.

It is an object of this invention to provide a method whereby butadiene can be polymerized to a high content of cis-1,4 structure, that is, a cis-1,4 content greater than 90 percent. Another object is to provide a catalyst system by which these polymerizations may be accomplished. Another object is to form copolymers of isoprene or other conjugated diolefins and butadiene, in which the repeat units derived from butadiene have a high content of cis-1,4 structure. Other objects will become apparent as the description proceeds.

The catalytically promoted polymerization of conjugated diolefins is well known to the art. Many catalysts that have been proposed for the polymerization of 1,3-dienes are catalysts of either the Ziegler-Natta type or alkali metal catalysts such as butyllithium. Usually these prior art catalysts have yielded polydienes having mixed structures, that is, mixtures of cis-1,4; trans-1,4; 1,2- and 3,4-structure. However, several prior art catalysts have been shown to give predominantly the desirable cis-1,4 structure. One such system is a ternary catalyst system comprised of (1) an alkyl-aluminum halide, (2) a cerium metal chelate compound and (3) a trialkylaluminum or trialkylaluminum hydride. Another such system is also a ternary catalyst system comprised of (1) at least oragnometallic compound wherein the metal is selected from a class consisting of metals of Groups I, II and III of the Periodic Table, (2) at least one organonickel salt or organonickel complex-compound and (3) at least one compound selected from a class consisting of boron trifluoride and complex-compounds thereof.

The present catalyst system differs markedly from the prior art catalyst systems in that one of the catalyst compounds of the present invention is selected from a group consisting of "inorganic" metal tetrafluoroborates, metal hexafluorophosphates, metal hexafluoroantimonates and organic derivatives of hexafluorophosphates and hexafluoroantimonates.

Thus, according to the present invention, butadiene or butadiene in combination with other conjugated diolefins is polymerized by contact, under solution polymerization conditions, with a catalyst system comprising (A) at least one organometallic compound wherein the metal is selected from Groups I, II and III of the Periodic System, (B) at least one compound selected from a group consisting of nickel salts of carboxylic acids, organic complex compounds of nickel and nickel tetracarbonyl and (C) at least one compound selected from a group consisting of (1) tetrafluoroborates of lithium, beryllium, calcium, magnesium, nickel and cobalt, (2) lithium hexafluorophosphate, (3) lithium hexafluoroantimonate, and (4) organic derivatives of hexafluorophosphate and hexafluoroantimonate.

The monomers useful in the practice of this invention are those monomers commonly known as conjugated diolefins and which respond to the formula

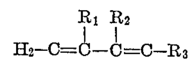

wherein $R_1$, $R_2$ and $R_3$ are selected from a group consisting of hydrogen and alkyl radicals containing from about 1 to about 10 carbon atoms and wherein $R_1$, $R_2$ and $R_3$ may or may not be the same. Representative examples of conjugated diolefins include 1,3-butadiene; isoprene, 1,3-pentadiene, 2,3-dimethyl-1,3-butadiene; 2-methyl-3-ethyl - 1,3 - butadiene; 1,3-hexadiene; 3-methyl-1,3-pentadiene and the like.

When considering the organometallic compounds containing metals from Groups I, II and III, it is preferred for this invention to use organoaluminium compounds, organolithium aluminum compounds, organomagnesium compounds and organozinc compounds.

By the term "organoaluminum compound" is meant any organoaluminum compound responding to the formula:

$$Al\begin{cases}R_1\\R_2\\R_3\end{cases}$$

in which $R_1$ is selected from a group consisting of hydrogen, fluorine, and a monovalent hydrocarbon radical such as alkyl, alkenyl, aryl, aralkyl, alkaryl, cycloalkyl and alkoxy containing from about 1 to about 20 carbon atoms and $R_2$ and $R_3$ are monovalent hydrocarbon radicals selected from a group consisting of alkyls, alkenyls, aryls, aralkyls, alkaryls and cycloalkyls containing from 1 to about 20 carbon atoms. Representative of the compounds responding to the formula set forth above are: diethylaluminum fluoride, di-n-propylaluminum fluoride, di-n-butylaluminum fluoride, dihexylaluminum fluoride, dioctylaluminum fluoride and diphenylaluminum fluoride. Also included are diethylaluminum hydride, di-n-propylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl n-propylaluminum hydride, p-tolylethylaluminum hydride, p-tolyl n-propylaluminum hydride, p-tolyl isopropylaluminum hydride, benzyl ethylaluminum hydride, and other organoaluminum hydrides. Also included are ethoxydiethylaluminum, ethoxydipropylaluminum, ethoxydiisobutylaluminum and other alkoxydialkylaluminum compounds. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organolithium aluminum" compound is meant any organolithium aluminum compound responding to the formula $R'R''_3LiAl$ where R' may be hydrogen or alkyl, alkaryl or aralkyl groups and R'' may be alkyl, alkaryl or aralkyl groups. Where R' and R'' are alkyl, alkaryl or aralkyl groups, they may or may not be the same. Representative of these compounds are n-butyltriisobutyllithium aluminum, tetrabutyllithium aluminum, tetraisobutyllithium aluminum, tetraethyllithium aluminum and the like. Representative of the hydrides are triethyllithium aluminum hydride, triisobutyllithium aluminum hydride, tributyllithium aluminum hydride and the like.

By the term "organomagnesium compounds" is meant, first, any organomagnesium complex responding to the formula $R_aMgX_b$ where R is a monovalent hydrocarbon radical such as alkyl, alkenyl, aryl, alkaryl, aralkyl and cycloalkyl containing from 1 to about 20 carbon atoms; X is a halogen, and "$a$" and "$b$" are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also, "organomagnesium compounds" means any organomagnesium compound or any organomagnesium halide of the Grignard type corresponding to the formulae $R_2Mg$ or RMgY where R may be alkyl, alkenyl, aryl, aralkyl or alkaryl and Y is fluoride or R' R''Mg where R' may be alkyl, alkenyl, aryl or alkaryl and R'' may be either alkyl, alkenyl, aryl, aralkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R is a monovalent hydrocarbon radical such as alkyl, alkenyl, aryl, aralkyl, alkaryl and cycloalkyl containing from about 1 to about 20 carbon atoms. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R is a monovalent hydrocarbon radical such as alkyl, alkenyl, aryl, aralkyl, alkaryl and cycloalkyl containing from about 1 to about 20 carbon atoms. Representative among such compounds are diethylzinc, dibutylzinc or diphenylzinc.

Representative of other organometallic compounds with metals selected from Groups I, II and III of the Periodic Table are compounds containing at least one of the metals, sodium and potassium, combined with at least one organic radical selected from the group consisting of alkyls, alkaryls, aralkyls and aryls.

The (B) catalyst component is selected from a class consisting of nickel salts of carboxylic acids, organic complex compounds of nickel and nickel tetracarbonyl. These compounds can be compounds of the said metal with a mono- or bidentate organic ligand containing up to 20 carbon atoms. "Ligand" is defined as an ion or molecule bond and considered bonded to a metal atom or ion. Monodentate means having one position through which covalent or coordinate bonds with the metal may be formed; bidentate means having two positions through which covalent or coordinate bonds with the metal may be formed.

Representative examples of the nickel salts of carboxylic acids and organic complex compounds of nickel are nickel benzoate, nickel acetate, nickel naphthenate, bis-(alpha-furyl) dioxime nickel, nickel octanoate, nickel palmitate, nickel sterate, nickel acetylacetonate, bis(salicylaldehyde) ethylene diimine nickel, nickel salicylaldehyde, and the like.

The (C) catalyst component is selected from a group consisting of tetrafluoroborates of lithium, beryllium, calcium, magnesium, nickel and cobalt; lithium hexafluorophosphate; lithium hexafluoroantimonate and organic derivatives of hexafluorophosphate and hexafluoroantimonate.

Representative examples of the tetrafluoroborates and organic derivatives of hexafluorophosphate and hexafluoroantimonate include lithium fluoroborate, beryllium fluoroborate, calcium fluoroborate, magnesium fluoroborate, nickel, fluoroborate, cobalt fluoroborate, triphenylmethyl hexafluorophosphate, triphenylmethyl hexafluoroantimonate, di(2-ethylhexyl) ammonium hexafluorophosphate, and the like.

The compounds useful as the (C) catalyst component are usually employed employed as suspensions in an inert solvent. By the term "inert solvent" is meant that the solvent does not affect the particular compound of the (C) catalyst component employed. Such solvents are usually aliphatic, aromatic and cycloaliphatic hydrocarbons, representative of which are pentene, hexane, heptane, benzene, toluene, cyclohexane and the like.

The three component catalyst system of this invention has shown polymerization activity over a wide range of catalyst concentrations and catalyst ratios. Apparently, the three catalyst components interact to form the active catalyst. As a result, the optimum concentration for any one catalyst component is dependent upon the concentration of the other catalyst components. Although polymerization will occur over a wide range of catalyst concentrations and ratios, polymers having the most desirable properties are obtained over a more narrow range. It has been found that polymerization will occur when the mole ratio of the (A) component of the catalyst system to the (B) catalyst component ranges from about 0.3/1 to about 200/1, and when the mole ratio of the (C) catalyst component to the (B) catalyst component ranges from about 1/1 to about 300/1 and where the mole ratio of the (A) component of the catalyst system to the (C) component of the catalyst system ranges from about 0.05/1 to about 5/1.

The preferred $(A)/(B)$ mole ratio ranges from about 2/1 to about 40/1; the preferred $(C)/(B)$ mole ratio ranges from about 2/1 to about 100/1 and the preferred $(A)/(C)$ mole ratio ranges from about 0.15/1 to about 2/1.

The three catalyst components may be charged to the polymerization system as separate catalyst components in either a stepwise or a simultaneous manner, sometimes called "in situ." The three component catalyst may also be "preformed" outside the polymerization system whereby all of the catalyst components are mixed in the absence of butadiene, either with or without an inert diluent and the resulting complete blend then added to the polymerization system.

The catalyst may also be "preformed" outside the polymerization system whereby all the catalyst components are mixed in the presence of small amounts of butadiene or other conjugated diolefins. The amount of the butadiene present can vary over a wide range but must be a catalytic amount. For good results the molar ratio of butadiene to the (B) catalyst component can range from about 1/1 to about 1000/1. A preferred mole ratio of butadiene to the (B) catalyst component ranges from about 3/1 to about 300/1.

The concentration of the total catalyst system employed depends on a number of factors such as purity of the system, polymerization rate edsired, temperature and other factors, therefore, specific concentrations cannot be set forth except to say that catalytic amounts are used. Some specific concentrations and ratios which produce polymers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature, such as −10° C. or below, up to high temperatures of 100° C. or higher. However, a more desirable temperature range is between about 20° C. and about 80° C. Ambient pressures are usually used but higher or lower pressures may be employed.

As employed in this specification, inherent viscosity, [$\eta$], is defined as the natural logarithm of the relative viscosity at 30° C. divided by the polymer concentration for a 0.5 percent (wt./vol.) solution in toluene and is expressed in deciliters per gram (dl./g.).

The cis-1,4 structure of the polymers was determined by infrared analysis.

The practice of this invention is further illustrated by reference to the following examples which are intended to be representative rather than restrictive of the scope of the invention.

EXAMPLE I

A purified butadiene (BD) in benzene solution containing 100 grams (gms.) of butadiene per liter of solution was charged into 4-ounce reaction bottles. Nitrogen was flushed over the surface of the premix and the catalyst charged in situ. The catalyst system employed consisted of a 0.25 molar solution of triethyl-aluminum (TEAL) in benzene, a 0.05 molar solution of nickel octanoate (NiOct) in benzene and a 0.23 molar suspension of nickel fluoroborate hydrate [$Ni(BF_4)_2 \cdot XH_2O$] in benzene. The nickel fluoroborate hydrate was obtained by drying crystals of nickel tetrafluoroborate hexahydrate [$Ni(BF_4)_2 \cdot 6H_2O$] at 94° C. and 29 inches of mercury vacuum for 16 hours. The weight loss during drying was 29 percent of the theoretical water of hydration.

After the catalysts were injected, the sealed bottles were tumbled end-over-end in a 50° C. water bath. The polymerizations were deactivated by the addition of a suitable stopping agent and an antioxidant was added. The microstructure of the polymer produced in Experiment No. 5 was found to be 96.5 percent cis-1,4-, 1.5 percent trans-1,4- and 2.1 percent 1,2-polybutadiene. The microstructure of the polymer produced in Experiment No. 9 was found to be 95.4 percent cis-1,4-, 2.7 percent trans-1,4- and 1.9 percent 1,2-polybutadiene. Table I below contains further pertinent data:

TABLE I

| Exp. No. | Millimoles/100 gms. BD | | | Reaction time, hrs. | Yield, weight percent | [$\eta$] |
|---|---|---|---|---|---|---|
| | TEAL | NiOct | Ni fluoroborate | | | |
| 1 | 0.75 | 0.02 | 0.75 | 4 | 60 | 2.8 |
| 2 | 0.75 | 0.05 | 0.75 | 18 | 93 | 3.0 |
| 3 | 1.0 | 0.05 | 0.35 | 18 | 55 | 3.1 |
| 4 | 1.0 | 0.05 | 0.45 | 18 | 83 | 3.2 |
| 5 | 1.0 | 0.05 | 0.75 | 4 | 76 | 2.8 |
| 6 | 1.0 | 0.05 | 1.50 | 1 | 45 | 3.1 |
| 7 | 1.0 | 0.05 | 1.50 | 4 | 84 | 3.0 |
| 8 | 0.6 | 0.10 | 0.75 | 17 | 75 | 2.8 |
| 9 | 1.0 | 0.10 | 1.50 | 16 | 94 | 2.8 |
| 10 | 1.0 | 0.10 | 3.0 | 18 | 93 | 2.5 |
| 11 | 1.0 | 0.10 | 6.0 | 18 | 95 | 2.1 |
| 12 | 1.5 | 0.10 | 1.5 | 16 | 96 | 2.5 |

EXAMPLE II

A series of polymerization reactions was carried out similar to Example I above except that the polymerization bottles were run at 80° C. rather than 50° C. The catalyst components employed in this series were the same as those used in Example I. The polymer produced in Experiment No. 4 was found to have a microstructure composed of 95.4 percent cis-1,4-, 2.0 percent trans-1,4-, and 2.6 percent 1,2-polybutadiene. Table II sets forth a more detailed description of the polymerization conditions and results:

TABLE I

| Exp. No. | Millimoles/100 gms. BD | | | Reaction time, hrs. | Yield, weight percent | [$\eta$ |
|---|---|---|---|---|---|---|
| | TEAL | NiOct | Ni fluoroborate | | | |
| 1 | 0.75 | 0.05 | 0.30 | 4 | 54 | 2.7 |
| 2 | 0.75 | 0.05 | 0.45 | 4 | 80 | 2.1 |
| 3 | 0.75 | 0.05 | 0.75 | 2 | 77 | 2.2 |
| 4 | 1.0 | 0.05 | 0.75 | 2 | 80 | 1.9 |
| 5 | 1.0 | 0.05 | 1.50 | 4 | 84 | 1.7 |

EXAMPLE III

A series of polymerizations similar to Example I was carried out with the exception that a 0.25 molar solution of tetraethyllithium aluminum ($LiAlEt_4$) in a mixture containing 20 percent by volume of tetrahydrofuran (THF) and 80 percent by volume of benzene was employed in place of the TEAL employed in Example I. The nickel fluoroborate was prepared by azeotropic distillation of toluene from $Ni(BF_4)_2 \cdot 6H_2O$ in order to remove a part of the water of hydration, followed by the addition of sufficient benzene to give a 0.45 molar suspension. Analysis by the Karl Fischer method (ASTM E–203–64) of an aliquot of the nickel fluoroborate suspension indicated that 22 percent of the theoretical amount of water of hydration had been removed. The microstructure of the polymer formed in Experiment No. 1 was found to be 95.6 percent cis-1,4- and in Experiment No. 5 it was 95.9 percent cis-1,4-polybutadiene. All reactions were carried out for a period of 18 hours. The amounts of the various catalyst components employed, the yields and the inherent viscosities are set forth in Table III below:

TABLE III

| Exp. No. | Millimoles/100 gms. BD | | | Yield weight percent | [η] |
|---|---|---|---|---|---|
| | $LiAlEt_4$ | NiOct | Ni fluoroborate | | |
| 1 | 0.75 | 0.01 | 0.75 | 67 | 2.6 |
| 2 | 1.0 | 0.01 | 0.75 | 48 | 3.2 |
| 3 | 1.0 | 0.01 | 1.50 | 74 | 2.7 |
| 4 | 1.0 | 0.02 | 1.50 | 93 | 2.5 |
| 5 | 1.0 | 0.05 | 1.50 | 97 | 2.6 |

EXAMPLE IV

A series of polymerization reactions were carried out similar to Example I except that five nickel fluoroborates containing varying amounts of water of hydration were employed instead of the single nickel fluoroborate employed in Example I. The nickel fluoroborate in Experiment No. 1 was undried and contained 6 moles of water of hydration. The nickel fluoroborate in Experiment No. 2 was dried under heat and vacuum (84° C. at 29 inches of Hg) for 16 hours undergoing a weight loss equivalent to 9 percent of the theoretical water of hydration. The nickel fluoroborate employed in Experiment No. 3 was dried under heat and vacuum (94° C. at 29 inches of Hg) for 16 hours losing the equivalent of 29 weight percent of its water of hydration. The nickel fluoroborate used in Experiment No. 4 was dried under heat and vacuum (111° C. at 20 inches of Hg) for 60 hours; analysis by the Karl Fischer method (ASTM E-203-64) indicated that it had lost 33 percent of its water of hydration. In Experiment No. 5, the nickel fluoroborate employed was prepared by distillation of benzene from $Ni(BF_4)_2 \cdot 6H_2O$; this partially dried nickel fluoroborate contained an estimated five moles of water by hydration. Table IV contains representative data:

TABLE IV

| Exp. No. | Millimoles/100 gms. BD | | | Yields, weight percent at— | | [η] |
|---|---|---|---|---|---|---|
| | TEAL | NiOct | Ni fluoroborate | 2 hrs. | 18 hrs. | |
| 1 | 1.0 | 0.05 | 1.5 | 50 | 91 | 2.9 |
| 2 | 1.0 | 0.05 | 1.5 | 79 | 94 | 2.8 |
| 3 | 1.0 | 0.05 | 1.5 | 78 | 95 | 2.8 |
| 4 | 1.0 | 0.05 | 1.5 | 48 | 92 | 2.7 |
| 5 | 1.0 | 0.05 | 1.5 | 73 | 95 | 2.9 |

EXAMPLE V

A series of polymerizations was carried out similar to Example I except that a 0.3 molar suspension of lithium fluoroborate ($LiBF_4$) in benzene was employed instead of nickel fluoroborate. In Experiment No. 6 a 0.25 molar solution of tetraethyllithium aluminum ($LiAlEt_4$) was employed in place of the TEAL employed in the preceding polymerizations of this series. The microstructure of the polybutadiene formed in Experiment No. 4 was found to consist of 94.6 percent cis-1,4-, 3.2 percent trans-1,4- and 2.2 percent 1,2-polybutadiene. The microstructure of the polybutadiene formed in Experiment No. 6 was found to contain 96.9 percent cis-1,4-, 1.0 percent trans-1,4- and 2.1 percent 1,2-polybutadiene. All experiments in this series were carried out at 50° C. for 17 hours with the exception of Experiment No. 6 which was reacted at 50° C. for 40 hours. Table V below contains all pertinent data:

TABLE V

| Exp. No. | Millimoles/100 gms. BD | | | Yield weight percent | [η] |
|---|---|---|---|---|---|
| | Al | NiOct | $LiBF_4$ | | |
| 1 | 0.75 | 0.05 | 4 | 65 | 3.4 |
| 2 | 0.75 | 0.10 | 6 | 44 | 3.4 |
| 3 | 1.0 | 0.05 | 6 | 67 | 3.3 |
| 4 | 1.0 | 0.10 | 6 | 80 | 2.9 |
| 5 | 1.0 | 0.10 | 12 | 83 | 2.3 |
| 6 | 0.5 | 0.05 | 4 | 35 | 2.7 |

EXAMPLE VI

Two polymerization reactions were carried out on butadiene monomer employing a reverse addition of the individual catalyst components. Thus, a 0.3 molar suspension of lithium fluoroborate ($LiBF_4$) in benzene was added to the reaction bottles followed by addition of a 0.05 molar solution of nickel octanoate (NiOct) in benzene and addition of a 0.25 molar solution of triethyl aluminum (TEAL) in benzene. The reactions were carried out for 17 hours. Table VI contains representative data:

TABLE VI

| Exp. No. | Millimoles/100 gms. BD | | | Temp., ° C. | Yield weight percent | [η] |
|---|---|---|---|---|---|---|
| | $LiBF_2$ | NiOct | TEAL | | | |
| 1 | 4.0 | 0.1 | 1.0 | 50 | 53 | 3.4 |
| 2 | 5.0 | 0.1 | 1.0 | 80 | 69 | 1.9 |

EXAMPLE VII

Three butadiene polymerization reactions were carried out similar to Example I above but employing a preformed catalyst mixture consisting of butadiene, a 0.25 molar TEAL solution, a 0.05 molar NiOct solution and a 0.23 molar $Ni(BF_4)_2 \cdot XH_2O$ suspension. The polymerizations were run for 18 hours at 50° C. with the exception of Experiment No. 3 which was run at 80° C. Table VII contains representative data. The polymer produced in Experiment No. 1 had a cis-1,4-polybutadiene content of 96.4 percent.

TABLE VII

| Exp. No. | Millimoles/100 gms. BD | | | | Yield, weight percent | [η] |
|---|---|---|---|---|---|---|
| | BD | TEAL | NiOct | Ni fluoroborate | | |
| 1 | 15.0 | 1.0 | 0.05 | 0.75 | 78 | 2.7 |
| 2 | 22.5 | 1.5 | 0.075 | 1.12 | 83 | 2.5 |
| 3 | 15.0 | 1.0 | 0.05 | 0.75 | 71 | 2.2 |

EXAMPLE VIII

A series of polymerizations was carried out similar to Example I except that the (C) catalyst component was selected from a group consisting of a 0.1 molar lithium heaxfluorophosphate ($LiPF_6$) suspension in benzene, a 0.1 molar (di(2-ethylhexyl) ammonium hexafluorophosphate $[(C_8H_{17})_2NH_2PF_6]$ suspension in benzene, a 0.1 molar triphenylmethyl hexafluorophosphate ($Ph_3CPF_6$) suspension in benzene and a 0.36 molar triphenylmethyl hexafluoroantimonate ($Ph_3CSbF_6$) suspension in benzene. Representative data are set forth in Tables VIIIa and VIIIb. The experiments in Table VIIIa were conducted in benzene at 50° C. for 17 hours. The experiments in Table VIIIb were conducted in hexane at 50° C. for 17 hours.

TABLE VIIIa

| Exp. No. | (C) Catalyst component | Millimoles/100 gms. BD | | | Yield, weight percent | [η] | Percent cis-1,4 content |
|---|---|---|---|---|---|---|---|
| | | TEAL | NiOct | (C) | | | |
| 1 | $LiPF_6$ | 0.85 | 0.10 | 5.0 | 66 | 1.6 | 95 |
| 2 | $(C_6H_5)_3CPF_6$ | 0.85 | 0.10 | 1.0 | 25 | [a] 1.4 | 94 |
| 3 | $(C_8H_{17})_2NH_2PF_6$ | 0.85 | 0.25 | 1.25 | 53 | [b] ND | ND |

[a] Polymerization carried out at 80° C.
[b] ND=not determined.

TABLE VIIIb

| Exp. No. | (C) Catalyst component | Millimoles/100 gms. BD TEAL | NiOct | (C) | Yield, weight percent | [η] | Percent cis-1,4 content |
|---|---|---|---|---|---|---|---|
| 1 | $(C_6H_5)_3CSbF_6$ | 0.60 | 0.05 | 0.6 | 63 | 2.7 | 96 |
| 2 | $(C_6H_5)_3CPF_6$ | 0.60 | 0.10 | 0.5 | 51 | 2.6 | 96 |
| 3 | $(C_6H_5)_3CPF_6$ | 0.60 | 0.10 | 1.0 | 49 | 2.8 | [a] ND |
| 4 | $(C_8H_{17})_3NH_2PF_6$ | 1.50 | 0.10 | 1.25 | 16 | 3.1 | 94 |

[a] ND=not determined.

While certain representative embodiments and details have been shown for the purpose of illustrating the invention, it will be apparent to those skilled in the art that various changes and modifications may be made therein without departing from the spirit or scope of the invention.

What is claimed is:

1. A process for the polymerization of butadiene in mixture with other conjugated diolefins to form polymers containing at least 90 percent of the butadiene units in the cis-1,4 configuration comprising contacting at least one diolefin under polymerization conditions with a catalyst system comprising (A) at least one organometallic compound wherein the metal is selected from Groups I, II and III of the Periodic System, (B) at least one compound selected from a group consisting of nickel salts of carboxylic acids, organic complex compounds of nickel and nickel tetracarbonyl, and (C) at least one compound selected from a group consisting of (1) tetrafluoroborates of lithium, beryllium, calcium, magnesium, nickel and cobalt, (2) lithium hexafluorophosphate, (3) lithium hexafluorophosphate, (4) organic derivatives of hexafluorophosphate and hexafluoroantimonate selected from the group consisting of triphenylmethyl hexafluorophosphate, triphenylmethyl hexafluoroantimonate and di(2-ethylhexyl) ammonium hexafluorophosphate wherein the mole ratio of catalyst component (A) to catalyst component (B) ranges from about 0.3/1 to about 200/1, wherein the mole ratio of catalyst component (C) to catalyst component (B) ranges from about 1/1 to about 300/1 and wherein the mole ratio of the catalyst component (A) to catalyst component (C) changes from about 0.05/1 to about 5/1.

2. A process according to claim 1 wherein the conjugated diolefin is 1,3-butadiene.

3. A process according to claim 1 wherein the catalyst component (A) is a trialkylaluminum compound corresponding to the formula $$Al{-}R_1,\ Al{-}R_2,\ Al{-}R_3$$

in which $R_1$, $R_2$, and $R_4$ are monovalent alkyl radicals containing from about 1 to about 20 carbon atoms.

4. A process according to claim 1 wherein the catalyst component (A) is a tetraalkyllithium aluminum compound corresponding to the formula $R'R''_3LiAl$ where R' and R'' are alkyl groups.

5. A process according to claim 1 wherein the catalyst component (C) is selected from the group consisting of lithium tetraflouorborate, nickel tetrafluoroborate, lithium hexafluorophosphate, triphenylmethyl hexafluoroantimonate, triphenylmethyl hexafluorophosphate and di(2-ethylhexyl) ammonium hexafluorophosphate.

6. A process according to claim 1 in which the preferred mole ratio of $(A)/(B)$ ranges from about 2/1 to about 40/1, the preferred role ratio of $(C)/(B)$ ranges from about 2/1 to about 100/1 and the preferred mole ratio of $(A)/(B)$ ranges from about 0.15/1 to about 2/1.

References Cited

UNITED STATES PATENTS

| | | | |
|---|---|---|---|
| 3,432,517 | 3/1969 | Ueda et al. | 260—94.3 |
| 3,445,367 | 5/1969 | Kallenbach | 260—94.9 |
| 3,446,788 | 5/1969 | Throckmorton | 260—94.3 |
| 3,471,462 | 10/1969 | Matsumoto et al. | 260—94.3 |
| 3,478,009 | 11/1969 | Genge | 260—94.7 |
| 3,624,000 | 11/1971 | Throckmorton. | |

JOSEPH L. SCHOFER, Primary Examiner

W. F. HAMROCK, Assistant Examiner

U.S. Cl. X.R.

260—82.1